United States Patent Office 2,876,135
Patented Mar. 3, 1959

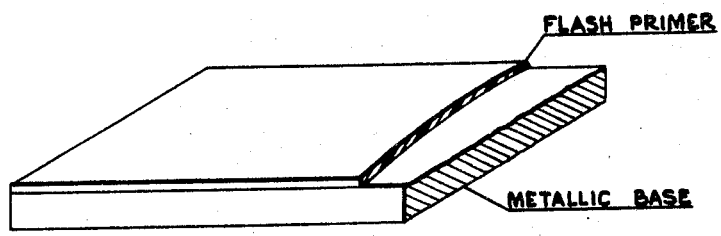
INVENTOR.
MORRIS LEVINE

2,876,135

COATING COMPOSITIONS

Morris Levine, Cleveland Heights, Ohio, assignor to Pittsburgh Plate Glass Company, Allegheny County, Pa., a corporation of Pennsylvania Application September 1, 1955, Serial No. 532,112

8 Claims. (Cl. 117—76)

This invention relates to protective coating compositions for metal surfaces, such as automobile bodies, and pertains more particularly to fast, air-drying "flash primers," which can be utilized as a base coat for subsequent coats of lacquer or enamel, and which in combination with a suitable surface filling composition produces, in a single baking cycle, an undercoat system superior to the one-coat combination "primer surfacer" systems in general current use, and that is equal or better than two-coat systems of separately baked primer and separately baked surfacer, with important economies in time, and in capital investment in space, conveying and baking facilities.

It has been customary in the automotive industry to apply to bare metal surfaces a primer or a combination primer-surfacer designed to protect the metal against corrosion and to provide for good adhesion to the metal of subsequent coats which may be of lacquer or enamel, or surfacing coats of putty, filler or the like, followed by finish coats of lacquer or enamel. This metal primer is baked on automobile bodies, for example, for about thirty minutes or more at a temperature of about 275° F., or equivalent schedules of time and temperature, and on sheet metal, such as hoods, fenders, and other metal parts and assemblies at similar baking schedules or at higher temperatures for shorter periods of time, for example, ten to fifteen minutes at 425° F.

In the case of automobile bodies, and when required on other parts and assemblies, the primer coat is covered with a "surfacer" whose principal function is to fill defects in the metal. This filling or smoothing of metal defects such as scratches or fabrication marks is secured by baking the surfacer and then sanding the surface until it is substantially level. The surface leveling attained during the sanding process gives very much improved appearance when the metal is finally coated with lacquer or enamel. The "surfacer" is usually a coating composition containing a high percentage of pigment which produces a relatively non-swelling, insoluble, film, and which permits the finished surface to remain smooth when lacquered or enameled.

The surfacer has relatively poor corrosion resistance and flexibility compared with the primer due to the highly pigmented nature of the former, so that the quality of the combined system of primer and surfacer in resisting corrosion and providing adhesion to the metal surface of subsequently applied decorative coatings must be provided largely by the separately baked primer.

Because of the high cost of separately applying and baking the metal primer, and because of the great amount of time consumed in the separate baking operation, the two-coat undercoat system has largely been discarded. It has been replaced by the so-called "combination coat," or "primer-surfacer," a one-coat system designed to provide both metal protection and filling properties. However, in order to retain the metal protective qualities of the separately baked primer it is necessary to sacrifice metal filling properties, and it is recognized that the combination primer-surfacer undercoat is, in fact, a compromise in quality and performance in comparison with the separately baked primer and surfacer undercoat system.

It has now been discovered that certain resinous materials, specifically an alkyd resin of a particular type, a vinyl resin of a particular type, and an amine resin, can be blended in a suitable solvent system in such manner as to provide a metal primer which may be air dried for a matter of minutes, two minutes for example, and then coated with a highly pigmented metal filling surfacer, thus providing all the advantages of the two-coat primer and surfacer system. In fact, the adhesion, resistance to chipping, and corrosion resistance is equal or superior to the conventional two-coat system of separately baked primer and separately baked surfacer. No intermediate baking of the primer is necessary, but instead the primer and surfacer are baked together in a single operation, thus obviating the need for additional ovens and plant space for baking the primer coat, and appreciably reducing the time required to finish the coating operation.

The technique described in the foregoing paragraph is known as "flash priming." Heretofore, flash priming systems for products such as automobiles and the like have been deficient and unsatisfactory and not at all comparable to the separately baked primer and separately baked surfacer undercoat system. The deficiencies of such flash primers heretofore produced lie in their tendency to "alligator" upon subsequent application of surfacer or finish coats, and modification to eliminate alligatoring usually results in poor system adhesion and corrosion resistance. Consequently little or no benefit has heretofore been obtained by the use of flash primers in the automotive industry.

By use of the flash primer compositions of the present invention, however, it is possible to utilize as a filling coat a highly pigmented surfacer, and thus to provide metal protection previously obtainable only by baking a primer coat under the surfacer, and yet to avoid the great expenditure involved in separately baking the primer. Moreover, the economy of the flash primer, high-fill surfacer system is achieved without sacrifice of quality and appearance of the finished product, for, in fact, the use of the air drying primers of this invention in combination with the high-fill surfacer results in finished products which are of improved quality and which exhibit improved appearance readily discernible by the human eye. The easier sanding of the more highly pigmented high-fill surfacer also permits faster attainment of a smooth surface, for instance on an automobile production line. The flash primers also provide better adhesion of component coats of the finishing system, superior chip resistance, that is, resistance to the impact of sand and gravel, foreign objects, gouging with sharp objects, as well as possessing other useful properties.

With the possible exception of economy, all of the advantages of the flash primer compositions of the present invention, particularly when used in conjunction with a high filling type of surfacer, are even greater and more pronounced when compared with the one-coat combination primer-surfacers which are largely used now instead of a separately baked primer and separately baked surfacer undercoat system.

As indicated hereinabove, the coating compositions of the present invention contain as resinous components a mixture of an alkyd resin, a vinyl type resin, and an amine resin.

However, in order to obtain a composition which provides the unique combination of properties discussed hereinabove, it has been determined that an alkyd resin of a type not ordinarily employed in coating compositions is essential, namely, one of relatively short oil length and high acid number. Preferably, it is a drying oil modified alkyd resin of extremely high phthalic anhydride content, composed of about 35 percent to 37 percent of drying oil, 14 percent to 16 percent glycerin, and 49 percent to 51 percent phthalic acid or anhydride, each of these percentages being on a weight basis. Such alkyd resins have an acid number of about 35 to 50, and are not generally used in coating compositions because of the importance of having the acid number very low to prevent reactivity of the resin with basic pigments and for the purpose of stability, whereas in the compositions herein described an alkyd resin having a high acid number is needed to obtain a useful flash primer, particularly for automobile bodies.

The drying oil utilized is preferably linseed oil; however, other drying or semi-drying oils such as fish oils, castor oils, soybean oil, and the like can also be employed. It is also possible to replace a portion of the phthalic acid or anhydride with minor quantities of equivalent polyfunctional acids such as maleic acid or anhydride, fumaric acid, p-tertiary butyl benzoic acid, and the like, and in a similar manner a portion of the glycerin may be replaced with minor quantities of other polyfunctional alcohols such as pentaerythritol, trimethylol propane, ethylene glycol, or the like. Such other polyfunctional acids or alcohols should not, of course, be utilized in amounts which cause the alkyd resin to gel during preparation.

The preparation of the alkyd resin is carried out in the conventional manner, except that because of the extremely small amount of hydroxyl component present as compared to the acid component caution must be exercised to prevent formation of a gel. Normally, the alkyd resin is prepared by heating the phthalic acid or anhydride and the glycerin together with a drying oil derivative modified by ester interchange with glycerin in order to form the monoglyceride or diglycerides of fatty acids. In some instances "oil modification" is effected by first reacting the free fatty acid of a drying glyceride oil with glycerin to form mono- or diglycerides or mixtures thereof. These partial esters may then be incorporated with fatty acid and glycerin and the mixture heated to form the alkyd resin. It is also possible to obtain the oil modified resin by incorporation of the fatty acid and glycerin with the phthalic acid or anhydride and heating the mixture to reaction temperature. Preferably, the resin components are heated until water is evolved by condensation reaction and separated from the reaction zone. The reaction is continued until fairly high viscosity is obtained; for example, approximately W to Z or above, when the resin is diluted by about 50 percent by weight of xylol or other aromatic solvent.

The alkyd resin component is employed in a predominant amount in the mixture of resins in the air drying or flash primers. Preferably, it is present in an amount of about 65 percent to 70 percent by weight of the resinous components, although useful compositions are obtained when amounts as low as about 60 percent or as high as 80 percent by weight of the resinous components are used.

A second essential component of the primer compositions of this invention is a vinyl resin. The vinyl resins serve to render the primer composition partially insoluble in the solvents utilized in the surfacer, enamel, or lacquer, this property accounting for the many outstanding qualities of the flash primer. If other resins, such as nitrocellulose, chlorinated rubber, ethyl cellulose, or the like are substituted for the vinyl resin in the primer composition, major deficiencies such as excessive solubility, or complete insolubility, poor adhesion, and poor chip resistance result.

The most useful vinyl resins are basically copolymers consisting predominantly of a vinyl halide such as vinyl chloride, vinyl bromide, or vinyl iodide, with a vinyl ester of a saturated aliphatic monocarboxylic acid, preferably an acid containing about 1 to 6 carbon atoms. Included among the vinyl esters which may be employed are vinyl acetate, which is preferred, vinyl propionate, vinyl butyrate, vinyl caproate, and the like.

However, in many instances, copolymers of vinyl halides and vinyl esters of aliphatic monocarboxylic acids tend to be incompatible with other resinous materials except at very low levels. Accordingly, in order to improve the compatibility properties of such vinyl resins, it is desirable that the copolymer of the vinyl halide and vinyl ester be modified with a minor portion of a third component, preferably one which introduces hydroxyl (—OH) groups into the polymer structure, that is, into the copolymer chain. Hydroxyl groups are introduced into the copolymer chain by alkaline hydrolysis of at least a portion of the ester linkages in the copolymer structure.

The vinyl halide is the predominant component in the hydroxyl modified copolymers or interpolymers, ordinarily being present in an amount of about 50 percent to 95 percent by weight, while the ester of an aliphatic monocarboxylic acid is present in an amount of about 2 percent to 45 percent by weight, although it is to be understood that these proportions can be varied if desired. As indicated hereinabove, the hydroxy component is present in a minor proportion, ordinarily in an amount of about 1 percent to 3 percent by weight, calculated as hydroxyl. One particularly useful vinyl resin contains approximately 86 percent vinyl chloride, approximately 12 percent vinyl acetate, and approximately 2.3 percent hydroxy component (approximately 6 percent when calculated as vinyl alcohol). The above vinyl resin is readily available as a commercial product, as are other vinyl halide-vinyl ester copolymers which may be utilized in air drying flash primer compositions.

The vinyl resin is ordinarily utilized in an amount of about 25 percent to 30 percent by weight of the resinous components of the primer. However, larger or smaller amounts, for example, about 20 percent to 40 percent by weight, may also be used with satisfactory results.

The preferred amine resins for use in the coating compositions of this invention are those obtained by the condensation of urea with formaldehyde. Urea-formaldehyde resins may be prepared by dispersing dimethylol urea in butanol which has been slightly acidified. The dispersion is heated, and both etherification and polymerization reactions occur. It is essential that sufficient etherification take place before excessive polymerization occurs so that the product will have good solubility and stability. Conversely, if a high degree of etherification and relatively low polymerization occur, the resin will have low viscosity and will be slower curing. These factors are controlled by the amount and type of acidic catalyst, temperature, and the ratio of reactants. A variety of acids may be used, including phosphoric acid, formic acid, oxalic acid, and phthalic acid. In general, the ratio of combined butanol in the final resin is from 0.5 to 1.0 mole per mole of dimethylol urea; but, of course, a considerable excess of butanol is used during the resin manufacture. The water eliminated in the etherification and polymerization reactions, together with any water in the original dimethylol urea, is removed either by straight azeotropic distillation or by a continuous decantation procedure. When the desired degree of etherification and polymerization is reached, as indicated by solubility and compatibility tests, the resin is neutralized and concentrated.

A second type of amine resin which may be utilized, particularly if an intermediate surfacer film is applied before the finish coat of lacquer or enamel, is a triazine-aldehyde resin such as a melamine-formaldehyde resin. Triazine-aldehyde resins are prepared by the condensation of an aldehyde, particularly formaldehyde, with a triazine possessing the basic structure.

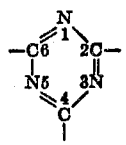

wherein at least one of the free valences is substituted by an amine group. The preferred triazine-aldehyde resin is one prepared by the condensation of melamine with formaldehyde. Melamine is the simplest triazine and possesses the structure

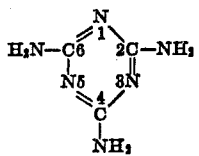

One useful type of melamine-formaldehyde resin is readily obtained, for example, by the method of U. S. Patent 2,529,856, which involves reacting a lower alkanol with a polymethylol melamine in the presence of an acid for such length of time as is necessary to obtain a clear solution and also for such length of time as is necessary to obtain reaction of the alkanol with the polymethylol melamine. The solution is then neutralized or made slightly alkaline, and concentrated by distillation under high vacuum until the concentration of resin solids is at least about 80 percent. If a solid dry resin is desired, the distillation is continued until a substantially anhydrous, viscous syrup is obtained. This syrup, upon cooling, forms a clear, water-white, resinous solid.

Solubility in butanol-xylol mixtures is obtained with the butylated methylol melamines, and increased solubility in hydrocarbons is obtained from alkylation with the higher alcohols. In the preparation of melamine coating resins, the methylol melamine may be prepared first followed by etherification or "butylation." However, it is more general to react all the ingredients together under slightly acid conditions. The characteristics of the finished resin will depend upon a number of variables, including the formaldehyde ratio, degree of etherification, type and amount of acid catalyst, and type and temperature of the reaction. In general, from 5 to 6 moles of formaldehyde are used with 1 mole of melamine and an excess of butanol slightly acidified. The mixture is heated to reflux and the reaction continued until a required viscosity and hydrocarbon tolerance are obtained. The water is removed by continuous decantation, and the acidity is neutralized before concentration of the resin. The water and free-formaldehyde contents of the finished resin should be less than 0.5 percent each.

In addition to melamine, other aminotriazines or their derivatives, for example, 2-chloro-4,6-diamine-1,3,5-triazine, 2 - phenyl - 4 - amino - 6 - hydroxyl - 1,3,5 triazine, 6-methyl-2,4-diamino-1,3,5-triazine, and the like may also be utilized to prepare useful aminotriazine-aldehyde resins.

The amine resin should be present in the primer composition in an amount of about 3 percent to 15 percent by weight based upon the total weight of the resinous components and preferably it is present in an amount of about 5 percent to 10 percent by weight.

It is surprising that so small an amount of an amine resin would produce such a pronounced effect in the coating composition; however, if it is not included, "lifting" and "alligatoring" (network of cracks having the general appearance of an alligator hide) or other irregularities of the surfacer and finish coats will occur.

No special expedients are necessary in formulating the coating compositions of this invention. For example, they may be prepared simply by incorporating the resinous components in a suitable solvent system by simple agitation, or each resinous component may be dissolved in a solvent and the resulting solutions combined to form the finished coating composition.

The solvent system may be any suitable combination of organic solvents depending primarily on the flash drying time desired. One particularly useful solvent system includes toluene, methyl isobutyl ketone (hexone), xylene, methyl ethyl ketone, and isopropanol, with toluene and methyl isobutyl ketone comprising the predominant components of the system. Other solvents which may be employed include ethyl alcohol, terpenes, aliphatic and aromatic naphthas, and the like. Ordinarily, the solvent will comprise about 60 percent to 85 percent by weight of the total coating composition, although, of course, larger or smaller amounts may be utilized depending upon the solids content desired. For example, it may be desirable to formulate the flash primer with a relatively high solids content and then reduce it to spraying consistency prior to the time of application.

A pigment is generally included in the formulation to provide hiding power and other desirable characteristics in the primer film. Suitable pigments include carbon black, iron oxide, zinc chromate, chromic phosphate, lead chromate, titanium dioxide, soapstone, and other coloring pigments, as well as inert materials such as talc, clays, and the like. The quantity of pigment may be as low as about 1 percent or as high as 25 percent or higher by weight of the total composition. By employing a pigment such as carbon black which in small quantities gives substantial film opacity, the film thickness can be accurately regulated, for the operator can determine the film thickness quite accurately simply by observing the degree of surface hiding. Pigments other than carbon black can be used to impart other desirable characteristics.

In the automotive industry it is desirable to use a pigment in the primer composition which provides a different color than is utilized in the surfacer so that when the sanding process is carried out, the operator can readily determine by inspection if he has sanded through to the primer, and thus avoid sanding to bare metal with attendant recoating problems.

Useful clear primers can also be obtained simply by omitting the pigment entirely, although it is somewhat difficult to determine surface coverage when a "clear" is employed.

In addition to the pigment, other materials may be added in small quantities. Such materials include low molecular weight epoxy resins, epichlorohydrin, propylene oxide, anti-skinning agents, and the like, which materials are ordinarily utilized in an amount of about 0.1 percent to 1 percent by weight. These materials contribute heat stability and package stability to the coating compositions; this is particularly true of the low molecular weight epoxy resins which in addition to acting as heat and package stabilizers, improve the corrosion resistance.

The following examples illustrate in detail the preparation of the "flash primers" of this invention and their use in forming protective coatings on metallic surfaces. The examples are not intended to limit the invention, however, for there are, of course, numerous possible variations and modifications.

*Example 1*

An alkyd resin was prepared by admixing 2341 pounds of linseed oil, 480 pounds of glycerin and 1.5 pounds of litharge, and heating the resulting mixture at a temperature of about 425° F. to 445° F. for approximately 2.7 hours, the reaction mixture being blanketed with carbon dioxide during the heating. The mixture thus formed was cooled and 100 cc. of a 0.5 percent solution (100 centistokes viscosity) of a silicone defoaming agent, 3200 pounds of phthalic anhydride, and 1008 pounds of glycerin added. The reaction mixture was then heated at a temperature of from 295° F. to 415° F. for about 5 hours, the temperature being maintained at about 415° F. for the last 2 hours of heating. The resin was thinned to a viscosity of Y—X at 46 percent solids.

*Example II*

The alkyd resin of Example I was utilized in the preparation of an air-drying or "flash primer" according to the following formulation:

| Component: | Pounds |
|---|---|
| Carbon black | 1.34 |
| Alkyd resin solids | 10.65 |
| Vinyl resin solids (hydroxyl modified copolymers of vinyl acetate and vinyl chloride known commercially as VAGH) | 4.31 |
| Urea-formaldehyde resin | 0.94 |
| Low molecular weight epoxy resin stabilizer | 0.20 |
| Propylene oxide | 0.20 |
| Toluol | 35.20 |
| Hexone | 27.00 |
| Xylol | 11.69 |
| Methyl ethyl ketone | 4.20 |
| Isopropanol | 4.27 |

The composition thus obtained was sprayed onto phosphated steel panels having the same composition as the steel utilized in automobile bodies. The primer was air dried for about 2 minutes and a surfacer having the following formulation was sprayed over the primer.

| Component: | Pounds |
|---|---|
| Iron oxide | 110 |
| Barium sulfate | 485 |
| Magnesium silicate | 55 |
| Aluminum silicate | 160 |
| Alkyd resin | gallons 22.93 |
| Kerosene | do 13.3 |
| Mixed naphthenic solvents | do 15.3 |
| Anti-skinning agent | do 0.27 |

The panels were then baked for 45 minutes at 275° F., sanded, and then coated with a lacquer of the type used in automobile finishing, and force dried. The adhesion of the coating system, and chip resistance were outstandingly superior to the same properties than when a conventional primer-surfacer composition is employed. Moreover, the surface appearance was much better than that obtained when a panel is prepared using a combination coat primer-surfacer. Satisfactory corrosion resistance was also obtained.

*Example III*

A flash primer containing a higher pigment content than that of Example II was prepared according to the following formulation:

| Component: | Pounds |
|---|---|
| Carbon black | 3.32 |
| Zinc chromate (or chromic phosphate) | 3.32 |
| Talc | 3.32 |
| Alkyd resin solids | 13.0 |
| Urea-formaldehyde resin (Uformite F-240) | 1.17 |
| Vinyl resin solids (VAGH) | 5.34 |
| Propylene oxide | 0.30 |
| Mixed naphthenic solvents | 18.81 |
| Ethyl amyl ketone | 6.04 |
| Isopropanol | 5.20 |
| Hexone | 40.08 |

The composition was sprayed on phosphated steel panels which were dried for about 3 minutes, after which the surfacer described in Example II was applied thereover. Panels were then baked for about 45 minutes at 275° F., sanded, and then coated with an automotive type lacquer, and baked. Outstanding adhesion, chip resistance and surface appearance were obtained.

*Example IV*

A flash primer was prepared as follows, utilizing a decreased amount of vinyl resin solids:

| Component: | Pounds |
|---|---|
| Carbon black | 3.32 |
| Zinc chromate (or chromic phosphate) | 3.32 |
| Talc | 3.32 |
| Alkyd resin solids | 14.44 |
| Urea-formaldehyde resin (Uformite F-240) | 1.17 |
| Vinyl resin solids (VAGH) | 3.90 |
| Propylene oxide | 0.30 |
| Mixed naphthenic solvents | 18.81 |
| Ethyl amyl ketone | 6.04 |
| Isopropanol | 5.20 |
| Hexone | 40.08 |

This composition was tested as in Examples II and III and found to impart excellent adhesion, chip resistance and surface appearance to the decorative lacquer film.

It is to be understood that the alkyd resin utilized in the examples can be replaced with other alkyds of a similar nature, that is, having a short or medium oil length and a relatively high acid number, preferably in the range of 35 to 50. When such other alkyd resins are substituted in the specific examples the resulting coating compositions are generally equivalent to those described herein.

Similarly, the urea-formaldehyde resin of the specific examples can be replaced by the other amine type resins, including other types of urea-formaldehyde resin or aminotriazine resins such as a melamine-formaldehyde resin. In a similar manner, the vinyl resin of the specific examples may be replaced with other vinyl chloride-vinyl acetate copolymers or other vinyl resins containing predominantly polyvinyl chloride.

While specific examples of the invention have been described hereinabove, it is not intended to limit the invention thereto, but to include all of the variations and modifications which are within the scope of the appended claims.

I claim:

1. A coating composition comprising a solvent having dissolved therein from 60 percent to 80 percent by weight of the resinous components, of a short oil alkyd resin having an acid number of about 35 to 50, from 20 percent to 40 percent by weight of the resinous components, of a vinyl resin which comprises a copolymer of a vinyl halide and a vinyl ester of a saturated aliphatic monocarboxylic acid, and from 5 percent to 15 percent by weight of the resinous components, of an amine-aldehyde resinous condensation product.

2. The coating composition of claim 1 wherein the vinyl resin is a copolymer of vinyl chloride and a vinyl ester of a saturated aliphatic monocarboxylic acid containing no more than 6 carbon atoms, said vinyl chloride being present in an amount of about 50 percent to 95 percent by weight, said copolymer containing in the copolymer chain about 1 percent to 3 percent by weight of an hydroxyl component.

3. The coating composition of claim 2 wherein the alkyd resin is prepared from reactants consisting essentially of linseed oil, phthalic acid, and glycerin.

4. The coating composition of claim 3 wherein the amine-aldehyde resin is a urea-formaldehyde resin.

5. A metallic object having thereon and adherent thereto a hardened film of the coating composition of claim 1.

6. An automobile body having thereon and adherent to the metallic surface thereof a hardened film of the coating composition of claim 1.

7. A method of preparing a coating composition characterized by its excellent adhesion to metallic surfaces, outstanding corrosion resistance and chip resistance, and its ability to dry in air in a period of several minutes, which comprises dissolving in a solvent therefor from 60 percent to 80 percent by weight of the resinous components of an alkyd resin prepared from reactants consisting essentially of linseed oil, phthalic acid, and glycerin, and having an acid number of about 35 to 50, from about 20 percent to 40 percent by weight of the resinous components of a copolymer of vinyl chloride and vinyl acetate, the vinyl chloride being present in an amount of about 50 percent to 95 percent by weight, said copolymer containing in the copolymer chain about 1 percent to 3 percent by weight of an hydroxyl component, and from 5 percent to 15 percent by weight of the resinous components of a member of the class consisting of urea-formaldehyde resins and melamine-formaldehyde resins.

8. A method of finishing an automobile body which comprises applying thereto as a base the coating composition of claim 1, permitting said composition to dry in air for from about 1 to 3 minutes, applying a filler composition to said base composition, baking said base composition and filler composition at a temperature of about 200° F. to 350° F., and then applying a finish coating to said baked surface.

References Cited in the file of this patent

UNITED STATES PATENTS

| | | |
|---|---|---|
| 1,860,098 | Jaeger | May 24, 1932 |
| 2,285,420 | Doolittle | June 9, 1942 |
| 2,568,004 | Heyman | Sept. 18, 1951 |